US012523772B2

(12) United States Patent
Kato et al.

(10) Patent No.: US 12,523,772 B2
(45) Date of Patent: Jan. 13, 2026

(54) RANGING DEVICE

(71) Applicant: DENSO CORPORATION, Kariya (JP)

(72) Inventors: Kazuki Kato, Kariya (JP); Kenichi Yanai, Kariya (JP); Kenta Azuma, Kariya (JP)

(73) Assignee: DENSO CORPORATION, Kariya (JP)

( * ) Notice: Subject to any disclaimer, the term of this patent is extended or adjusted under 35 U.S.C. 154(b) by 1144 days.

(21) Appl. No.: 17/486,198

(22) Filed: Sep. 27, 2021

(65) Prior Publication Data
US 2022/0011440 A1  Jan. 13, 2022

Related U.S. Application Data

(63) Continuation of application No. PCT/JP2020/012997, filed on Mar. 24, 2020.

(30) Foreign Application Priority Data

Mar. 28, 2019 (JP) .................. 2019-063650

(51) Int. Cl.
| | | |
|---|---|---|
| *G01S 17/931* | (2020.01) | |
| *G01S 7/4863* | (2020.01) | |
| *G01S 17/10* | (2020.01) | |
| *G01S 17/894* | (2020.01) | |
| *H10F 30/225* | (2025.01) | |

(52) U.S. Cl.
CPC .......... *G01S 17/931* (2020.01); *G01S 7/4863* (2013.01); *G01S 17/10* (2013.01); *G01S 17/894* (2020.01); *H10F 30/225* (2025.01)

(58) Field of Classification Search
CPC ...... G01S 17/931; G01S 7/4863; G01S 17/10; G01S 17/894; G01S 7/497; H10F 30/225; H10F 55/25
See application file for complete search history.

(56) References Cited

U.S. PATENT DOCUMENTS

| | | | | |
|---|---|---|---|---|
| 2004/0095492 A1* | 5/2004 | Baxter | ................... | H04N 25/00 348/E3.018 |
| 2005/0012968 A1* | 1/2005 | McCaffrey | ............. | H04N 25/42 348/E3.018 |
| 2005/0162638 A1* | 7/2005 | Suzuki | ..................... | G01C 3/08 356/5.01 |

(Continued)

*Primary Examiner* — Yuqing Xiao
*Assistant Examiner* — Jempson Noel
(74) *Attorney, Agent, or Firm* — Maschoff Brennan

(57) ABSTRACT

In a ranging device for measuring a distance to an object, a distance image acquisition unit is configured to, using light reception signal, acquire a distance image that indicates, at each pixel, a distance to the object within a region illuminated with illumination light. A background light image acquisition unit is configured to, using the light reception signals, acquire a background light image that indicates an intensity of background light received at each pixel. An information acquirer is configured to acquire intensity-related information related to the intensity of the background light. A resolution controller is configured to control a resolution of the distance image and a resolution of the background light image by setting a size of pixel regions independently for each of the distance image and the background light image according to the intensity of the background light indicated by the intensity-related information.

8 Claims, 13 Drawing Sheets

(56) References Cited

U.S. PATENT DOCUMENTS

| | | | |
|---|---|---|---|
| 2014/0071180 A1* | 3/2014 | Shin | G09G 5/10 |
| | | | 345/690 |
| 2015/0285625 A1* | 10/2015 | Deane | G01S 7/4816 |
| | | | 348/140 |
| 2016/0073088 A1* | 3/2016 | Cohen | G01S 17/894 |
| | | | 348/46 |
| 2017/0273161 A1 | 9/2017 | Nakamura | |
| 2018/0332268 A1* | 11/2018 | Xiao | H04N 13/332 |
| 2019/0079170 A1* | 3/2019 | Masuda | G01S 17/89 |

* cited by examiner

FIG.5
BRIGHT ENVIRONMENT
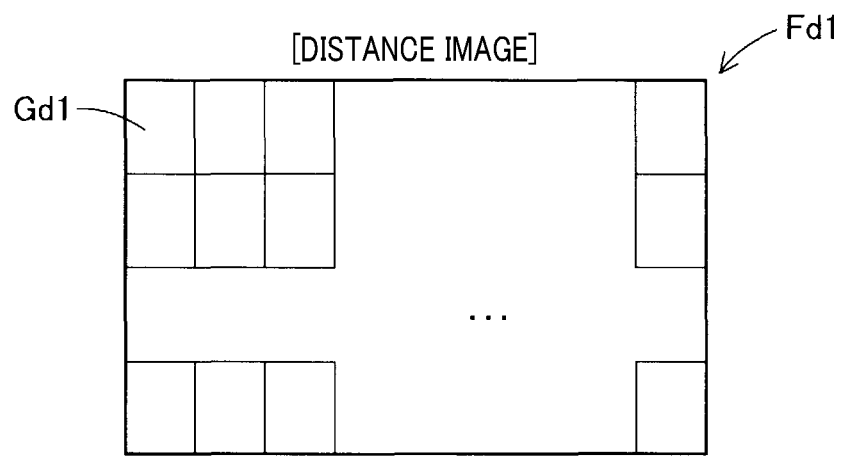
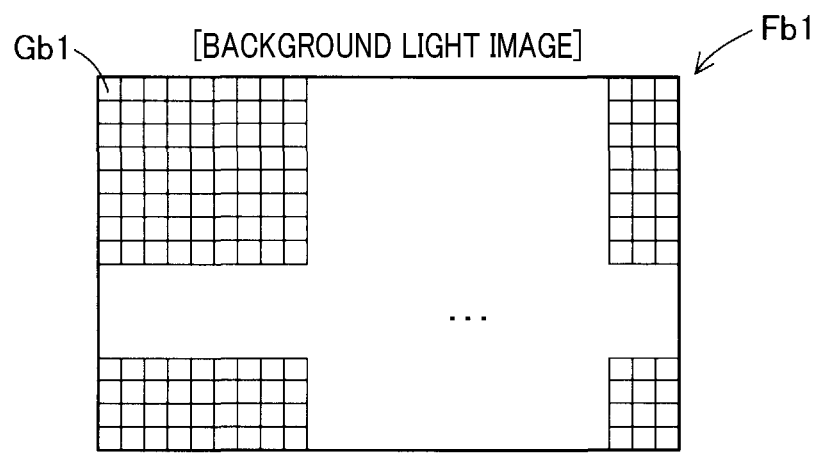

FIG.6
DARK ENVIRONMENT
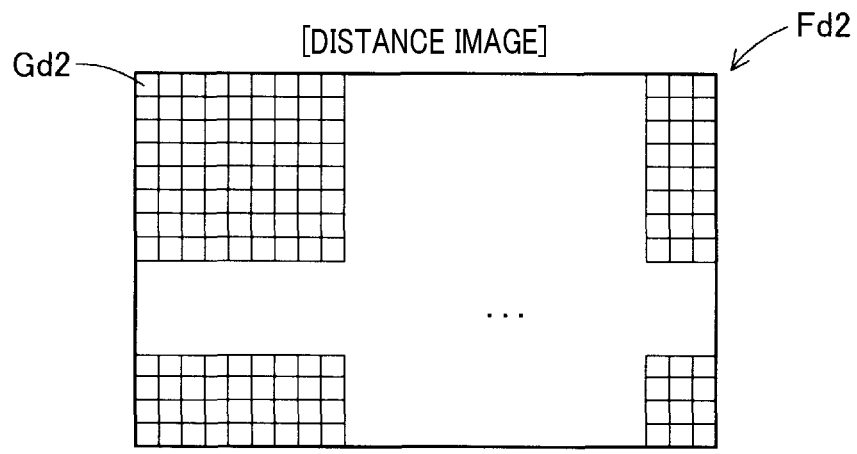
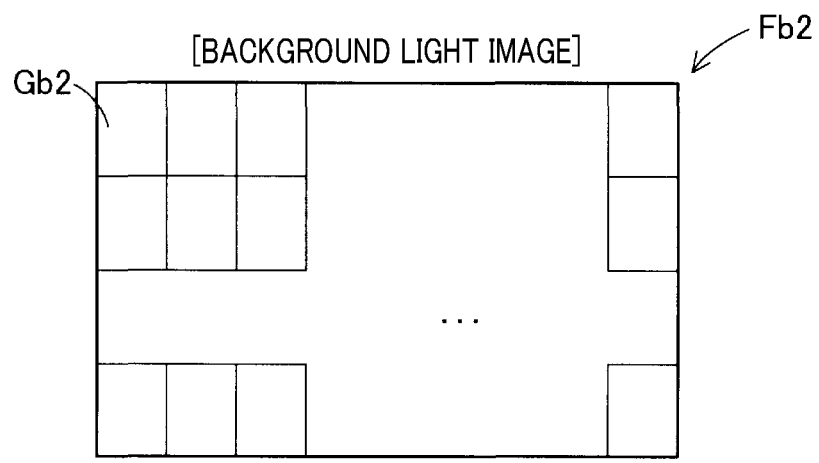

THIRD EMBODIMENT

THIRD EMBODIMENT

FIG.9
THIRD EMBODIMENT
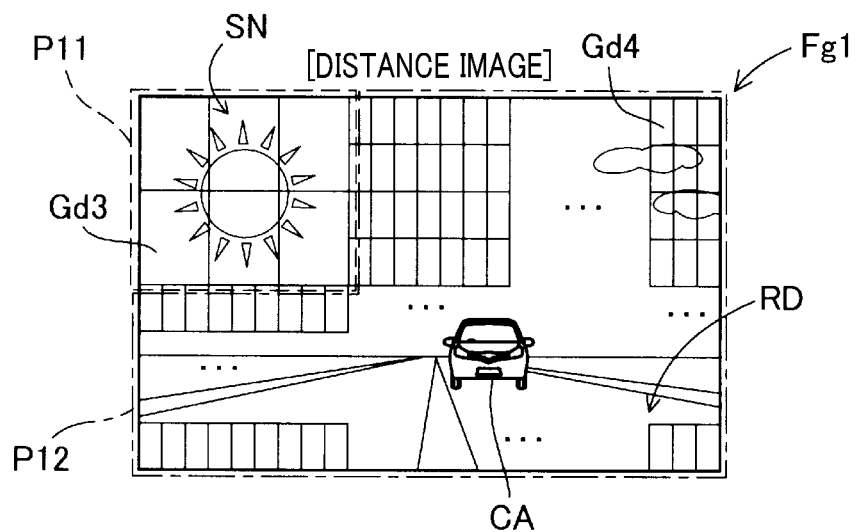
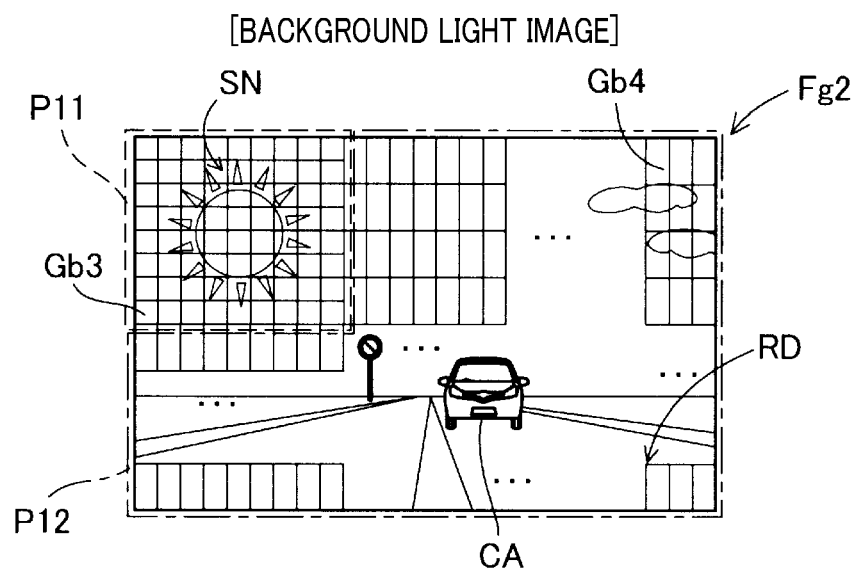

THIRD EMBODIMENT

FIG.11
THIRD EMBODIMENT
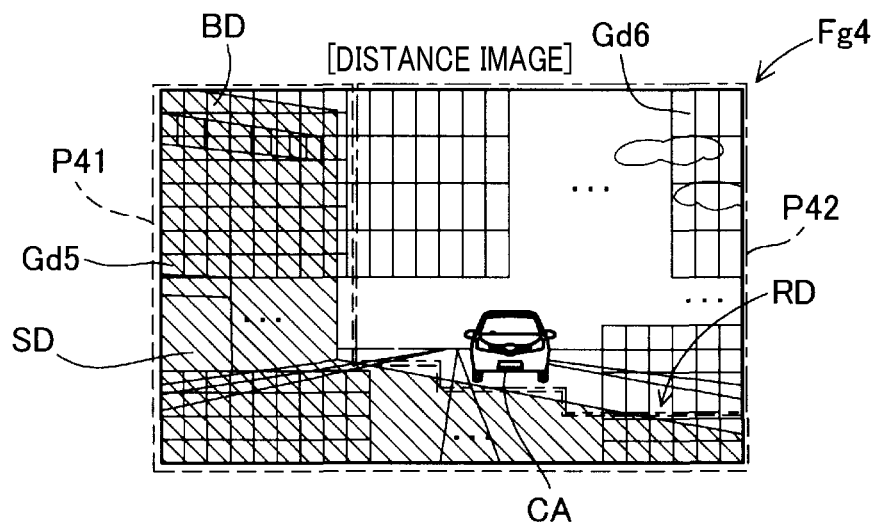
[DISTANCE IMAGE]
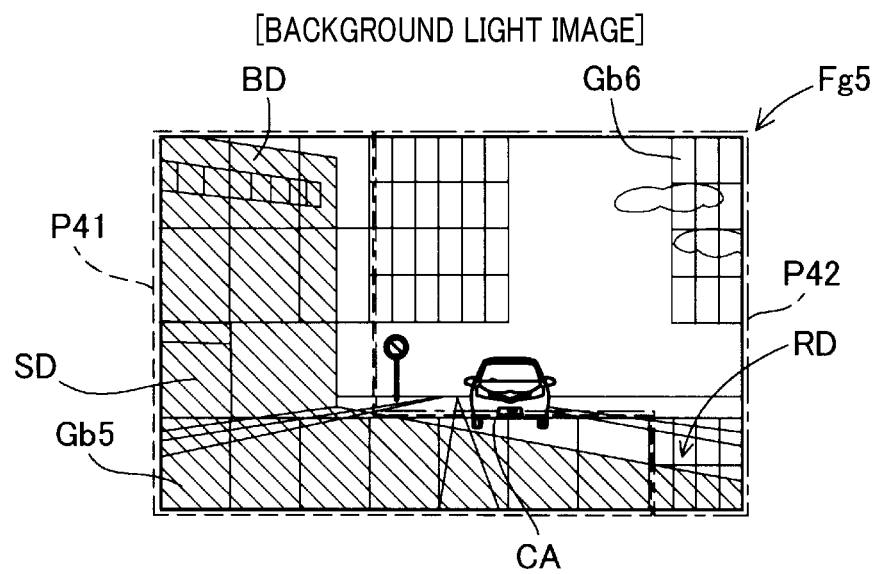
[BACKGROUND LIGHT IMAGE]

FOURTH EMBODIMENT

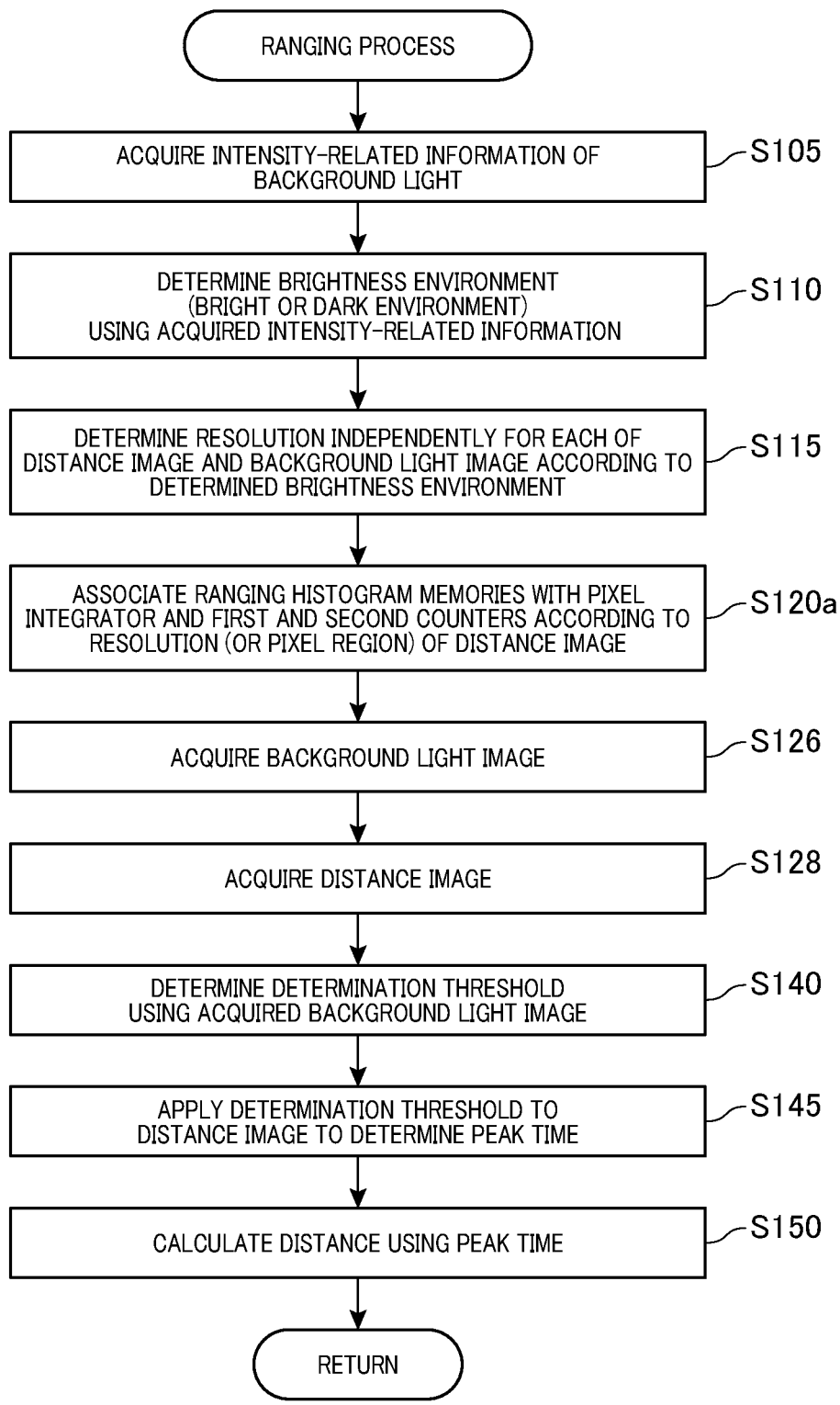

RANGING DEVICE

CROSS-REFERENCE TO RELATED APPLICATION

This application is based on and claims the benefit of priority from earlier Japanese Patent Application No. 2019-63650 filed Mar. 28, 2019, the description of which is incorporated herein by reference.

BACKGROUND

Technical Field

The present disclosure relates to a ranging device for measuring a distance to an object.

Related Art

Various ranging devices have been proposed, which emit light and receive reflected light of the emitted light from an object, and calculate a time of flight (ToF) that is a time from emission of the emitted light to reception of its reflected light, and thereby measure a distance to the object using the acquired time. Such ranging devices acquire, in addition to a distance image which is an image including reflected light and which has a value of distance measured in each direction as a value of each pixel, a background light image which is an image having, as a value of each pixel, the intensity of reflected light of sunlight, light of a street lamp, or the like from the object as background light (also referred to as ambient light). Then, an intensity threshold is determined based on the determined intensity of the background light, and the reflected light in the distance image is detected as light having the intensity higher than such intensity threshold.

BRIEF DESCRIPTION OF THE DRAWINGS

In the accompanying drawings:

FIG. 5 is an example of a distance image and a background light image in a bright environment in the first embodiment;

FIG. 6 is an example of the distance image and the background light image in a dark environment in the first embodiment;

FIG. 9 is an example of the distance image and the background light image in the third embodiment;

FIG. 11 is another example of the distance image and the background light image in the third embodiment;

FIG. 13 is a flowchart of a ranging process of the fourth embodiment.

DESCRIPTION OF SPECIFIC EMBODIMENTS

Figure 1:
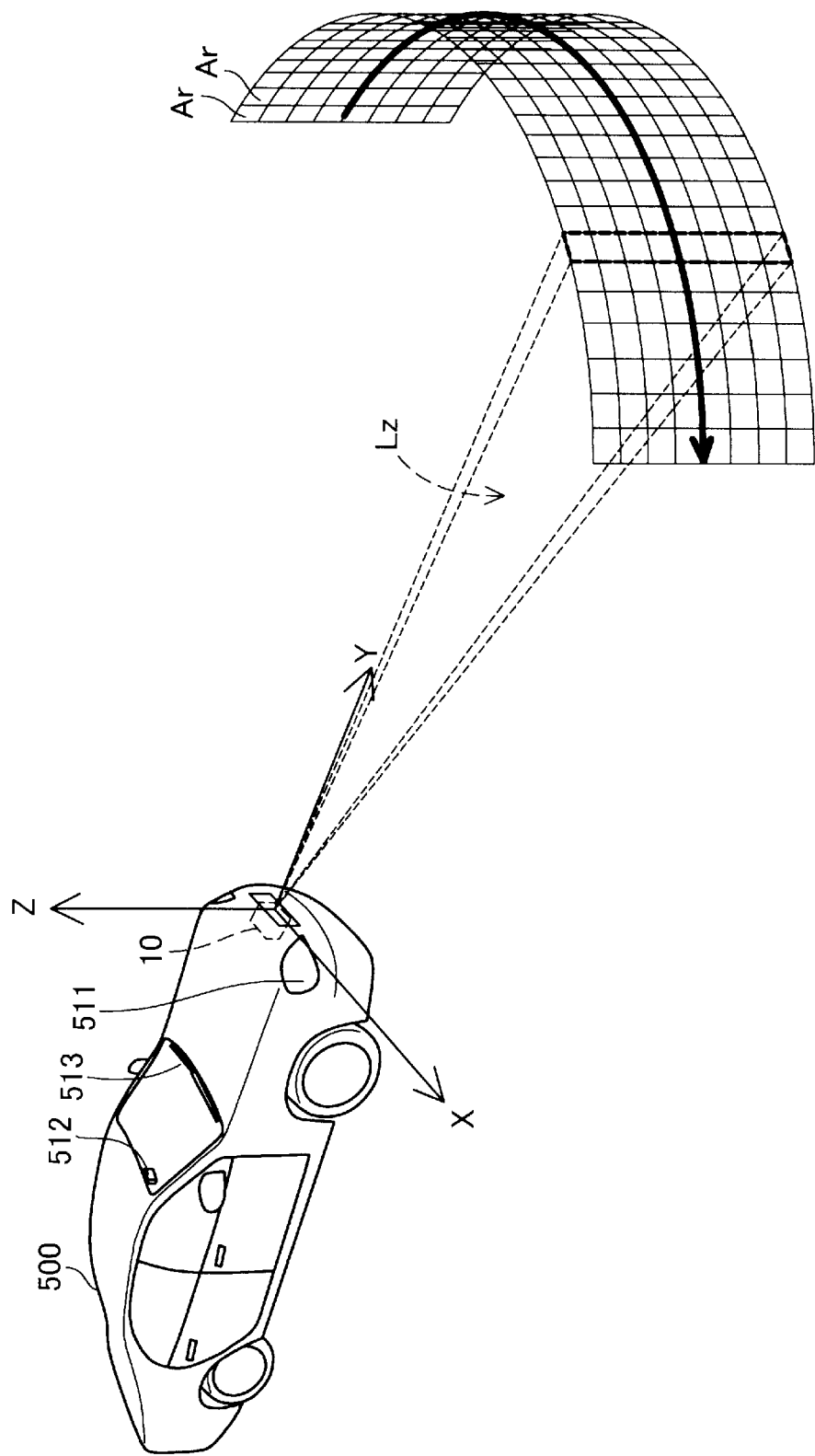
FIG. 1 is an illustration of a vehicle equipped with a ranging device according to one embodiment of the present disclosure and an illuminated region.

In the conventional ranging devices including the ranging device disclosed in JP-A-2017-173298, both the distance image and the background light image are acquired with the same resolution. Therefore, for example, when the distance image is captured with high resolution during sunny daylight hours, it is difficult to acquire the distance accurately due to noise. Conversely, in a relatively dark environment, such as in the evening, at night, or in a tunnel, although a higher-resolution distance image can be acquired while maintaining the measurement accuracy owing to low effect of noise, only a low-resolution distance image can be acquired. In addition, for example, when the background light image is acquired with high resolution in a relatively dark environment, very little light can be detected at each pixel and the intensity of the background light is determined as extremely low. In this case, light other than the reflected light is also likely to be incorrectly detected as reflected light from the object.

In view of the foregoing, it is desired to have a technique that allows the resolution of the distance image and the background light image to be set appropriately according to an environment in which the ranging device is used.

One aspect of the present disclosure provides a ranging device for measuring a distance to an object, comprising: a light emitting unit configured to emit illumination light every irradiation period. In the ranging device, a light receiving unit includes a two-dimensional array of a plurality of light receiving elements on a light receiving surface, and is configured to output a light reception signal in response to a light reception state of a set of the light receiving elements within a respective one of pixel regions whose size is variably set, the set of the light receiving elements forming one pixel. A distance image acquisition unit is configured to, using the light reception signals output from the light receiving unit, acquire a distance image that indicates, at each pixel, a distance to the object within a region illuminated with the illumination light. A background light image acquisition unit is configured to, using the light reception signals output from the light receiving unit, acquire a background light image that indicates an intensity of background light received at each pixel. An information acquirer is configured to acquire intensity-related information related to the intensity of the background light. A resolution controller is configured to control a resolution of the distance image and a resolution of the background light image by setting a size of the pixel regions independently for each of the distance image and the background light image according to the intensity of the background light indicated by the intensity-related information.

According to the ranging device configured as above, the resolution of the distance image and the resolution of the background light image are controlled by setting the size of the pixel regions independently for each of the distance image and the background light image according to the intensity of the background light indicated by the acquired intensity-related information. With this configuration, the resolution of the distance image and the resolution of the background light image can be set appropriately according to the usage environment of the ranging device.

The present disclosure can be implemented in numerous forms other than the ranging device, including, for example, a vehicle including the ranging device, a ranging method, a computer program for enabling a computer to function as the ranging device or to perform the ranging method, and a non-transitory computer readable storage medium storing such a program.

A. First Embodiment

A1. Device Configuration

As illustrated in FIG. 1, a ranging device 10 according to a first embodiment is mounted to a vehicle 500 and measures a distance to an object, such as another vehicle, a pedestrian, a building, or the like, located around and ahead of the vehicle 500. The ranging device 10 emits illumination light Lz and receives its reflected light from the object. In FIG. 1, the emission center position of the illumination light Lz is represented as the origin, the forward direction of the vehicle 500 as the Y-axis, the direction from left to right along the lateral direction of the vehicle 500 passing through the origin as the X-axis, and the vertical upward direction passing through the origin as the Z-axis. As illustrated in FIG. 1, the illumination light Lz is elongated beam of light in the Z-axis direction and is emitted via one-dimensional scanning in a direction parallel to the X-Y plane. The ranging device 10 receives background light in addition to the reflected light of the illumination light Lz from the object. The background light means light (direct light) different from the illumination light Lz, or light reflected from the object and received by the ranging device 10. Light different from the illumination light Lz corresponds to, for example, sunlight or light from a street lamp. The ranging device 10 determines the intensity of background light using information related to the intensity of light received from each predefined region Ar, and sets a threshold based on such intensity. The ranging device 10 then determines, among the light received from predefined regions Ar, the light having the intensity higher than the threshold as the reflected light from the object, and determines a time from emission of the illumination light Lz to reception of the reflected light, that is, a TOF (Time of Flight) of the light. Then, the ranging device 10 calculates the distance to the object assuming that such flight time TOF is a time for the light to make a round trip between the vehicle 500 and the object. Each predefined region Ar described above is a region corresponding to a pixel G described below.

Figure 2:
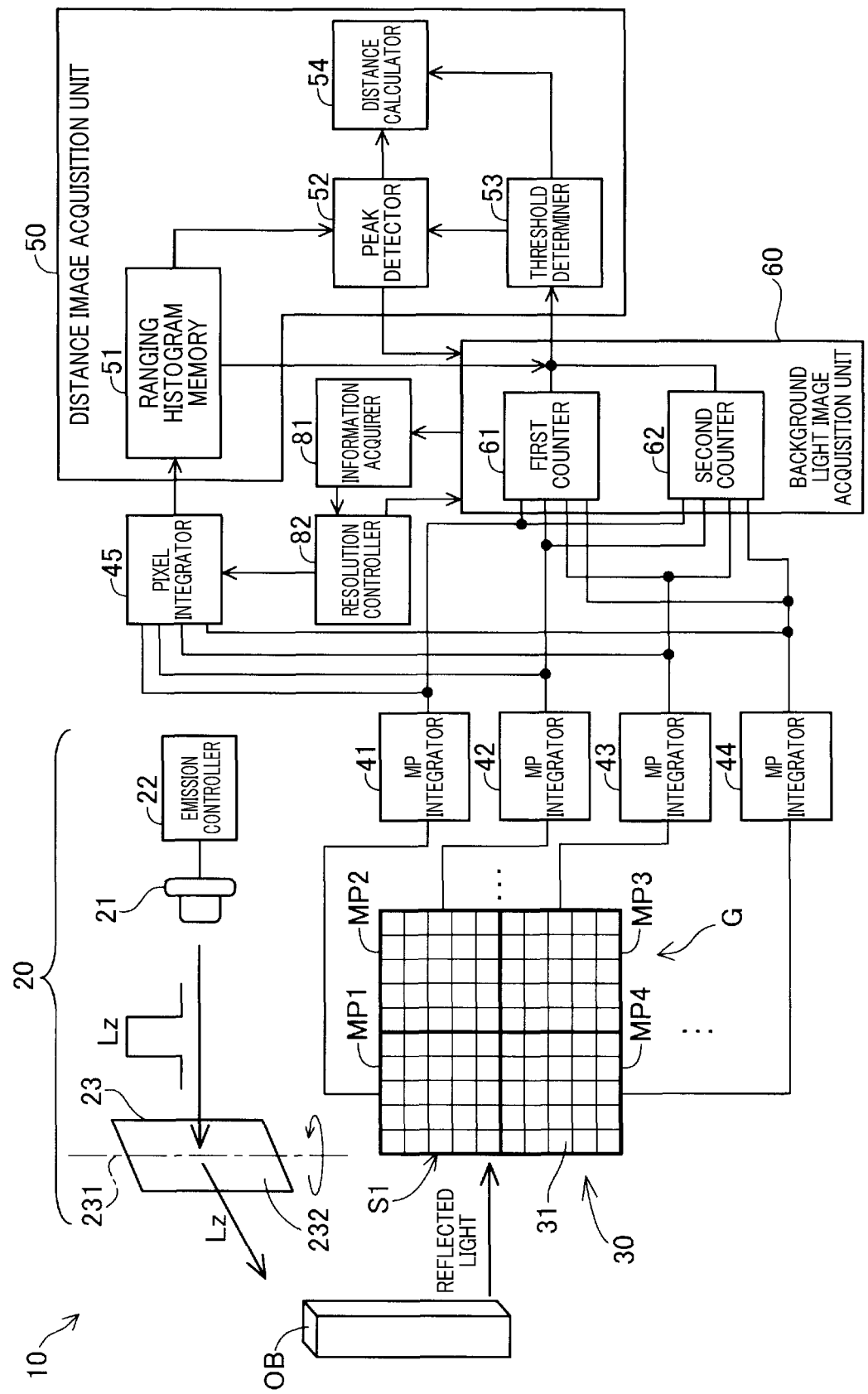
FIG. 2 is a block diagram of the ranging device of a first embodiment.

As illustrated in FIG. 2, the ranging device 10 includes a light emitting unit 20, a light receiving unit 30, four macro pixel (MP) integrators 41, 42, 43, 44, a pixel integrator 45, a distance-image acquisition unit 50, an information acquirer 81, and a resolution controller 82.

The light emitting unit 20 emits illumination light Lz. The light emitting unit 20 includes a laser source 21, an emission controller 22, and a scanner 23. The laser source 21 is formed of a semiconductor laser diode and emits a pulsed laser beam as the illumination light Lz every predefined period. For example, the predefined period is previously acquired by experiment and set as a period of time that is equal to or longer than a period of time required for reflected light from an object within a predefined region to be received by the ranging device 10 after emission of the illumination light Lz. The illumination light Lz emitted from the laser source 21 is formed as vertically elongated illumination light Lz as illustrated in FIG. 1 by an optical system (not shown). The emission controller 22 controls emission of the pulsed laser beam from the laser source 21 and rotation of the mirror 232. The scanner 23 performs one-dimensional scanning with the illumination light Lz over a predefined measurement region by rotating the mirror 232 around the rotation axis 231. The mirror 232 is formed of, for example, a MEMS mirror. The rotation of the mirror 232 is controlled by the emission controller 22. One-dimensional scanning with the illumination light Lz is performed by the scanner 23, such that the light emitting unit 20 emits the illumination light Lz while changing the direction of the illumination light Lz over the measurement region. Any other type of laser source, such as a solid-state laser, may be used as the laser source 21 instead of the laser diode element. The illumination light Lz may be horizontally elongated illumination light and scanning may be two-dimensional scanning.

The illumination light Lz emitted from the light emitting unit 20 is reflected by an object OB within the measurement region. The reflected light reflected by the object OB is received by the light receiving unit 30. In the present embodiment, the light receiving unit 30 receives the reflected light via an optical system (not shown) configured such that the size of the reflected light at the light receiving surface S1 is smaller than the size of the light receiving surface S1. The reflected light may be received by the light receiving unit 30 such that a portion thereof (e.g., a longitudinal end portion) protrudes from the light receiving surface S1.

The light receiving unit 30 includes a two-dimensional array of a plurality of pixels G on the light receiving surface S1. In FIG. 2, only one pixel G is depicted for illustration purposes. In the example of FIG. 1, each pixel G includes a total of four macro pixels MP1 to MP4 as a two-by-two array of macro pixels. Each macro pixel MP1, . . . , MP4 has a total of 25 light receiving elements 31 as a five-by-five array of light receiving elements. Therefore, in the example of FIG. 1, each pixel G has a total of 100 light receiving elements 31 as a ten-by-ten array of light receiving elements. In the present embodiment, each light receiving element 31 includes a single photon avalanche diode (SPAD). Upon reception of light (a photon), the SPAD outputs, with a certain probability, a pulse-shaped output signal (hereinafter also referred to as a light reception signal) indicating incidence of light. Therefore, in the example of FIG. 2, each macro pixel MP1, . . . , MP4 outputs 0 to 25 light reception signals according to the intensity of the received light. In addition, the pixel G as a whole outputs 0 to 100 light reception signals according to the intensity of the received light. A pixel region of the pixel G illustrated in FIG. 2, that is, a region of 2×2 macro pixels, i.e., a ten-by-ten array of light receiving elements 31, is referred to as a reference pixel region in present embodiment. However, the size or extent of the pixel G (pixel region) is variably set from the reference pixel region and is set according to the intensity of the background light in a ranging process described later.

A MP integrator 41 is connected to each of the light receiving elements 31 forming the macro pixel MP1 and counts the number of light reception signals output from the light receiving elements 31 within the macro pixel MP1. Similarly, each of the other MP integrators 42 to 44 are connected to each of the light receiving elements 31 forming the macro pixel and counts the number of light reception signals output from the light receiving elements 31 within the macro pixel (hereinafter also referred to as the number of light receptions). In FIG. 2, only the four MP integrators 41 to 44 corresponding to the four macro-pixels MP1 to MP4 forming only one pixel G are illustrated, but the ranging device 10 includes a plurality of such MP integrators for macro pixels forming other pixels G.

A pixel integrator 45 counts the number of light receptions for one pixel G, i.e., the number of light reception signals output from the light receiving elements 31 included in one pixel. Specifically, the pixel integrator 45 is connected to four MP integrators 41 to 44 and receives a count result from each of the MP integrators 41 to 44, that is, the number of light reception signals in each of the macro pixels MP1 to MP4, and adds them up. Although the pixel integrator 45 is provided for each pixel G, only the pixel integrator 45 corresponding to one pixel G is illustrated in FIG. 2. In addition, when the pixel region is changed, the pixel integrator 45 adds together values received from respective macro pixels within the changed pixel region.

The distance-image acquisition unit 50 acquires a distance image. The distance image means an image showing a distance to an object for each pixel G calculated based on the received light intensity at the pixel G. The distance image acquisition unit 50 includes a ranging histogram memory 51, a peak detector 52, a threshold determiner 53, and a distance calculator 54.

The ranging histogram memory 51 is provided for each pixel G. The ranging histogram memory 51 stores a histogram (hereinafter referred to as a ranging histogram) in which the received light intensity at the pixel G, i.e., the number of light receptions at the pixel G, is arranged by unit period. The ranging histogram memory 51 receives and stores an integrated value at the pixel G, that is, the number of light receptions at the pixel G, received from the pixel integrator 45. The ranging histogram memory 51 may be formed of, for example, a rewritable non-volatile memory such as an Electrically Erasable Programmable Read-Only Memory (EEPROM).

Figure 3:
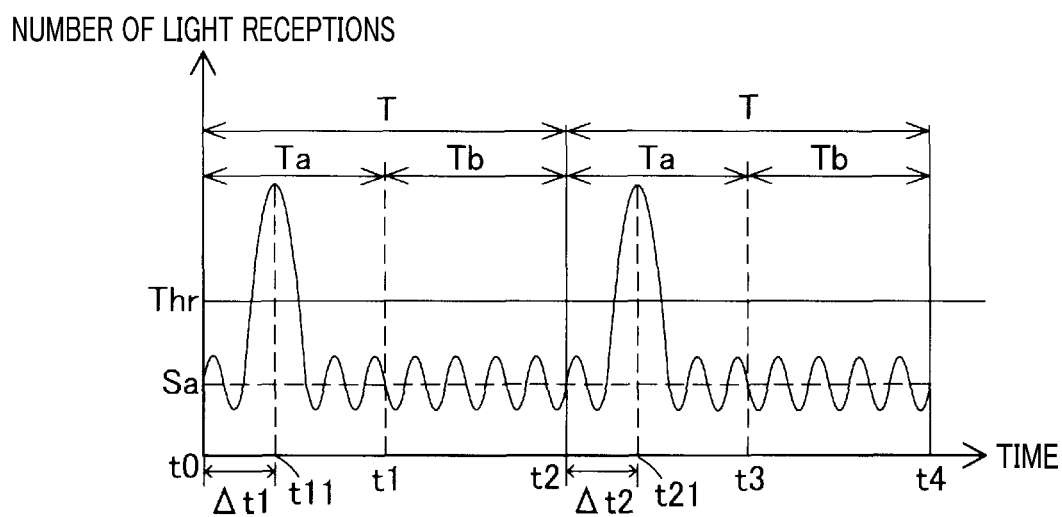
FIG. 3 is an example of a transition of a total number of light receptions output from a MP integrator.

The peak detector 52 detects a peak in the number of light receptions at which the number of light receptions is equal to or greater than a threshold determined by the threshold determiner 72 in each irradiation period T for each pixel G based on the ranging histogram (a temporal sequence of numbers of light receptions) stored in the ranging histogram memory 51, and determines times at which peaks occur. In the example of FIG. 3, the peak at time t11 and the peak at time t21 are detected.

The threshold determiner 53 determines a threshold (hereinafter also referred to as a determination threshold) used to determine whether a peak in the ranging histogram (a temporal sequence of numbers of light receptions) detected by the peak detector 52 is a peak arising from reflected light of the illumination light Lz. The determination threshold is determined based on the background light image. Details of how to determine the determination threshold will be described later.

The distance calculator 54 calculates a distance to the object. Specifically, a distance to the object is calculated using a period of time from emission of the illumination light Lz to detection of a peak by the peak detector 52 as a flight of time TOF. In the example of FIG. 3 where the determination threshold Thr is determined by the peak detector 52, since the number of light receptions is equal to or greater than the determination threshold Thr at the time t11, the distance calculator 54 calculates a distance to the object using the period of time Δt1 from time t0 to time t11 as a time of flight TOF. Similarly, since the number of light receptions is equal to or greater than the determination threshold Thr at time t21, the distance calculator 54 calculates a distance to the object using the period of time Δt2 from time t2 to time t21 as a flight time TOF.

The background light image acquisition unit 60 acquires a background light image, which is an image showing the received light intensity of the background light at each pixel G. The background light image acquisition unit 60 includes a first counter 61 and a second counter 62. Each of the counters 61 and 62 is connected to four MP integrators 41 to 44. The first counter 61 counts the number of light receptions output from the four MP integrators 41 to 44 during the first half period in the irradiation period of the illumination light Lz. The second counter 62 counts the number of light receptions output from the four MP integrators 41 to 44 during the second half period in the irradiation period of the illumination light Lz.

In FIG. 3, the horizontal axis indicates the time, and the vertical axis indicates the integrated number of light receptions output from the four MP integrators 41 to 44. Each of the periods of time from time t0 to time t2 and from time t2 to time t4 indicates an irradiation period T of the illumination light Lz. Time t1 is one-half of the period of time from time t0 to time t2, and time t3 is one-half of the period of time from time t2 to time t4. The first counter 61 counts the number of light receptions in the first half period Ta (time t0 to t1) of the irradiation period T from time t0 to time t2. Similarly, the first counter 61 counts the number of light receptions in the first half period Ta (time t2 to t3) of the irradiation period T from time t2 to time t4. The second counter 62 counts the number of light receptions in the second half period Tb (time t1 to t2) of the irradiation period T from time t0 to time t2. Similarly, the second counter 62 counts the number of light receptions in the second half period Tb (time t3 to t4) of the irradiation period T from time t2 to time t4.

In the example of FIG. 3, a peak in the number of light receptions occurs at time t11 in the irradiation period T from time t0 to time t2. This peak is a peak arising from reception of the reflected light. The period of time Δt1 from time t0 to t11 corresponds to the flight time TOF. Similarly, a peak in the number of light receptions occurs at time t21 in the irradiation period T from time t2 to time t4. This peak is arising from reception of the reflected light. The period of time Δt2 from time t2 to time t21 corresponds to the time of flight TOF. In the present embodiment, the time at which a peak in the number of light receptions occurs, e.g., each of time t11 and time t21 in the example of FIG. 3, is referred to as a peak time. In each irradiation period T, the number of light receptions is measured to be non-zero even at times other than the peak times. This is due to the background light.

In cases where a peak is detected by the peak detector 52, the background light image acquisition unit 60 acquires a background light image using the number of light receptions in a half period not including the time at which the peak is detected among the first half period Ta and the second half period Tb. Details of how to acquire the background light image will be described later. Although the background light image acquisition unit 60 has a pair of the first counter 61 and the second counter 62 for each pixel G, only the pair of the counters 61 and 62 corresponding to one pixel G is illustrated in FIG. 2 for illustration purposes.

The information acquirer 81 illustrated in FIG. 2 acquires information related to the intensity of the background light (hereinafter referred to as intensity-related information). In the present embodiment, the intensity-related information corresponds to the following information (i) to (iv):

(i) information about the number of light receptions indicating the intensity of the background light image;
(ii) information indicating a lighting state of lights 511 illustrated in FIG. 1 mounted to the vehicle 500;
(iii) information indicating a result of detection by a solar radiation sensor 512 illustrated in FIG. 1 mounted to the vehicle 500; and (iv) information indicating an operating state of a wiper device 513 illustrated in FIG. 1 mounted to the vehicle 500.

The above information (i) is acquired from the background light image acquisition unit 60. In the background light image acquisition unit 60, the average number of light receptions of the background light image is acquired as in the threshold determiner 72, and information about such average number of light receptions is transmitted to the information acquirer 81 as information indicating the intensity of the background light image. The above information (ii) means information indicating whether the light 511 is on or off, and is acquired from an electronic control unit (ECU) that controls the lights 511. The above information (iii) means an amount of solar radiation detected by the solar radiation sensor 512, and is acquired from an ECU that controls the solar radiation sensor 512. The above information (iv) means information indicating whether the wiper device 513 is operating, and is acquired from an ECU that controls the wiper device 513.

The resolution controller 82 controls the resolution of the distance image and the resolution of the background light image by setting the size of the pixel regions independently for each of the distance image and the background light image according to the intensity of the background light image indicated by the intensity-related information acquired by the information acquirer 81. The pixel integrator 45 acquires the numbers of light receptions from all of the MP integrators for one pixel according to the pixel region set by the resolution controller 82 and adds them up. The background light image acquisition unit 60 acquires the numbers of light receptions from all of the MP integrators for one pixel according to the pixel region set by the resolution controller 82 and adds them up using the first counter 61 or the second counter 62. The details about a process performed by the resolution controller 82 will be described later.

A2. Ranging Process

Figure 4:
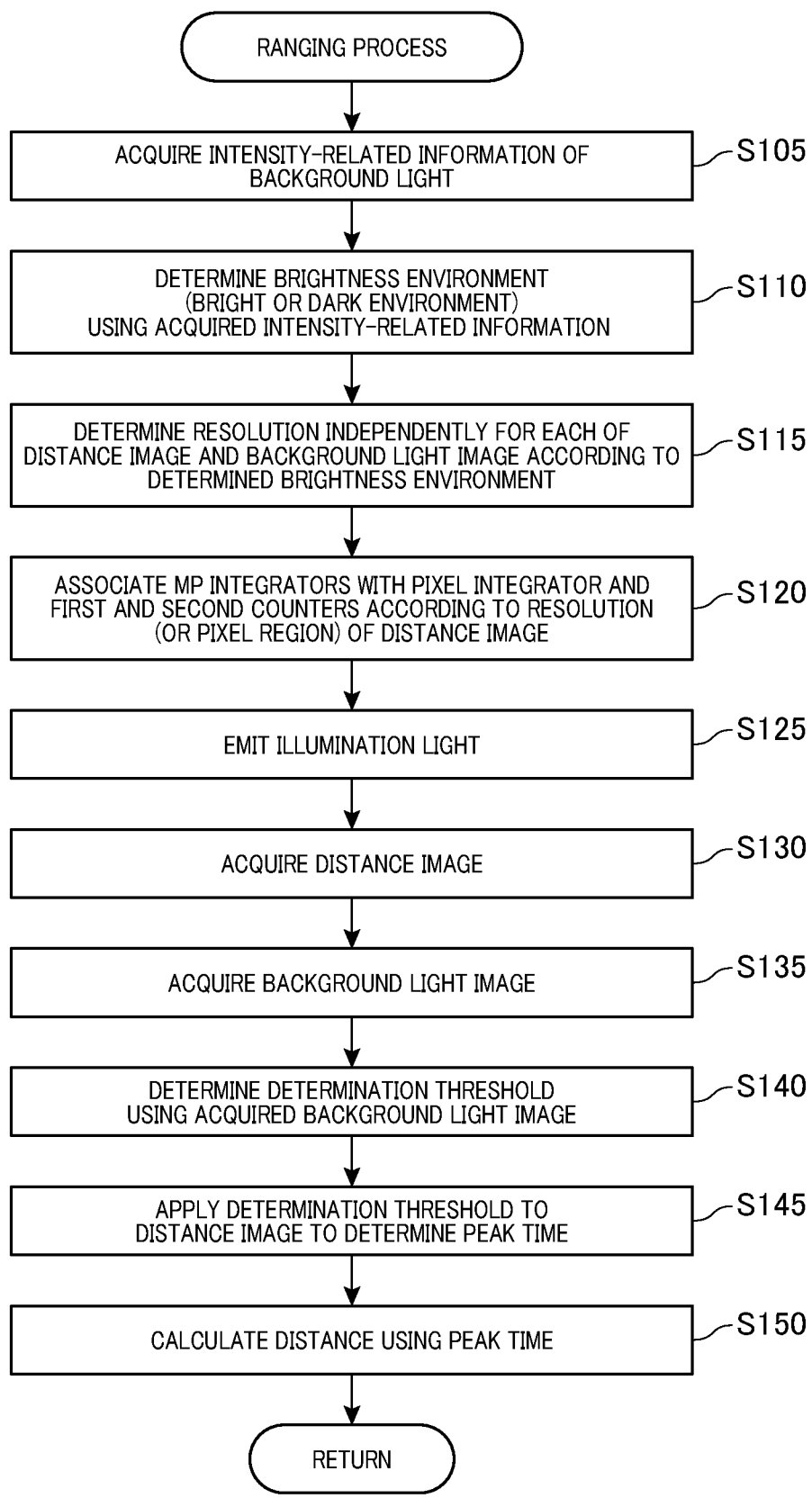
FIG. 4 is a flowchart of a ranging process of the first embodiment.

The ranging process illustrated in FIG. 4 is a process for measuring a distance to an object. The ranging process is performed when ignition of the vehicle 500 is turned on. In the vehicle 500, the ranging process may be initiated upon reception of the initiation instruction from a user at an interface where user's instructions for imitating and terminating the ranging process are received beforehand, such as a physical button provided on an instrument panel or a menu screen displayed on a monitor. The steps S105 to S150 described below, which are included in the ranging process, are repeatedly performed every irradiation period T.

The information acquirer 81 acquires the intensity-related information of the background light at step S105. Specifically, the information acquirer 81 acquires all of the above information (i) to (iv). As to the information (i), the average number of light receptions over the entire background light image acquired in the previous cycle is acquired.

At step S110, the resolution controller 82 determines a brightness environment of a region illuminated with the illumination light Lz based on the intensity-related information acquired at step S105. In the present embodiment, the brightness environment means either a bright environment (hereinafter referred to as a bright environment) or an environment that is darker than the bright environment (hereinafter referred to as a dark environment). The resolution controller 82 determines that the environment is a bright environment when the average number of light receptions of the background light image is equal to or greater than a threshold, and that the environment is a dark environment when the average number of light receptions of the background light image is less than the threshold. At step S110, it is determined that the environment is a bright environment when the above information (i) indicates that the average number of light receptions of the background light image is equal to or greater than the threshold, the above information (ii) indicates that the lights 511 are off, the above information (iii) indicates that the result of detection by the solar radiation sensor 12 is equal to or greater than a predefined solar radiation threshold, and the above information (iv) indicates that the wiper device 513 is off. In other cases, it is determined that the environment is a dark environment. Generally, the environment is determined as a bright environment when the vehicle 500 is traveling in a place different from the shade of a building or in a tunnel, during the daytime on a sunny day. The environment is determined as a dark environment when it is nighttime or when the vehicle 500 is traveling in the shade of a building or in a tunnel.

At step S115, the resolution controller 82 determines the resolution independently for each of the distance image and the background light image according to the brightness environment determined at step S110.

At step S115, in the bright environment, the resolution controller 82 reduces the resolution by setting each pixel region to be larger than the reference pixel region for the distance image Fd1, and sets each pixel region to the reference pixel region for the background light image Fb1. As illustrated in FIG. 5, the pixel Gd1 of the distance image Fd1 in the bright environment has a larger size than the pixel Gb1, that is, the pixel G, of the background light image Fb1. That is, the distance image has a lower resolution than the background light image. In the present embodiment, the lateral length of the pixel Gd1 is three times the lateral length of the pixel G, and the vertical length of the pixel Gd1 is four times the vertical length of the pixel G. The size of the pixel Gd1 is not limited to the size in the present embodiment, but may be any size larger than the size of the pixel G.

At step S115, in the dark environment, the resolution controller 82 sets each pixel region to the reference pixel region for the distance image Fd2, and reduces the resolution by expanding each pixel region for the background light image Fb2. The pixel region of the background light image Fb2 in the dark environment illustrated in FIG. 6 is the same as the pixel region of the distance image Fd1 in the bright environment illustrated in FIG. 5. The pixel region of the background light image Fb2 in the dark environment may be different in size from the pixel region of the distance image Fd1 in the bright environment, provided that the pixel region is larger in size than the reference pixel region (pixel G). That is, the background light image has a lower resolution than the distance image in the dark environment. The reason for setting such a resolution at step S115 will be described later. In FIGS. 5 and 6, only the size of each pixel (pixel region) is illustrated and the received light intensity at each pixel is omitted.

As illustrated in FIG. 4, at step S120, the resolution controller 82 associates the pixel integrator 45 with the MP integrators according to the resolution of the distance image determined at step S115, i.e., the pixel region of the distance image. The background light image acquisition unit 60 associates the two counters 61 and 62 with the MP integrators according to the resolution of the distance image determined at step S115, i.e., the pixel region of the distance image. For example, for the distance image in the bright environment illustrated in FIG. 5, three times as many MP integrators in the horizontal direction and four times as many MP integrators in the vertical direction are associated with one pixel integrator 45 as compared to the case of the reference pixel region (pixel G) illustrated in FIG. 2. For example, for the background light image in the bright environment illustrated in FIG. 5, four MP integrators 41 to 44 are associated with each of the two counters 61 and 62, as illustrated in FIG. 2.

As illustrated in FIG. 4, at step S125, the light emitting unit 20 emits the illumination light Lz. When there is an object OB, the reflected light from the object OB is received by the light receiving elements 31 and light reception signals are output in response thereto. Then, the numbers of light receptions are added up by the pixel integrator 45 associated with the MP integrators at step S120, and the numbers of light receptions are added up by each of the two counters 61 and 62 associated with the MP integrators at step S120.

At step S130, the distance-image acquisition unit 50 acquires a distance image, i.e., information indicating the number of light receptions by each pixel. At step S135, the background light image acquisition unit 60 acquires a background light image. How to acquire the background light image is described below. First, the background light image acquisition unit 60 determines, for each pixel G, whether a peak was detected in any of the first half period Ta and the second half period Tb of the previous irradiation period T. Next, the background light image acquisition unit 60 determines, using the first counter 61 and the second counter 62, the number of light receptions during the period of the current irradiation period T corresponding to the other period of the previous irradiation period T than the period in which the peak was detected, of the previous irradiation period T. For example, as illustrated in FIG. 3, for the pixel G illustrated in FIG. 2, the peak is detected in the first half period Ta of the irradiation period T from time t0 to t2. Therefore, in the subsequent irradiation period T from time t2 to t4, the number of light receptions during the second half period Tb, that is, the value of the second counter 62, is determined as the number of light receptions for the background light image. Then, for each pixel G, the background light image acquisition unit 60 converts the determined number of light receptions into the number of light receptions over the entire irradiation period T. For example, as described above, when the number of light receptions during the second half period Tb, i.e., the value of the second counter 62, is determined, the number of light receptions over the entire irradiation period T is determined by doubling the value of the second counter 62. When the number of light receptions during the first half period Ta, i.e., the value of the first counter 61, is determined, the number of light receptions over the entire irradiation period T is determined by doubling the value of the first counter 61 in the same manner. If no peak is detected in each of the first half period Ta and the second half period Tb, the value acquired by adding the value of the first counter 61 and the value of the second counter 62 is determined as the number of light receptions over the entire irradiation period T. In an alternative embodiment, an average of the value of the first counter 61 and the value of the second counter 62 may be used instead of the sum of them. The period of one-half of the irradiation period T, i.e., each of the first half period Ta and the second half period Tb, corresponds to a unit period in the present disclosure.

As illustrated in FIG. 4, at step S140, the threshold determiner 53 determines a determination threshold using the background light image acquired at step S135 The determination threshold is determined for each pixel G according to the resolution of the distance image. For example, for one pixel Gd1 of the distance image Fd1 illustrated in FIG. 5, the average of the numbers of light receptions from a total of 12 pixels Gb1 corresponding to the pixel Gd1, of the background light image, is acquired, and the determination threshold is determined as a value greater than such an average.

At step S145, the peak detector 52 applies the determination threshold determined at step S140 to the distance image acquired at step S130 to determine a peak time. As described above, in the example of FIG. 3, each of times t11 and t21 is determined as a peak time.

At step S150, the distance calculator 54 calculates the distance to the object OB using the peak time determined at step S145.

The reason why the resolution is reduced at above step S115 by expanding the pixel regions of the distance image in the bright environment and the pixel regions of the background light image in the dark environment will now be described. In the bright environment, the intensity of the background light is high. Thus, if each pixel is formed of a small number of SPADs, the intensity ratio between the reflected light and the background light detected at each pixel becomes small, that is, the S/N ratio deteriorates and the reflected light (from the object OB) can not be accurately determined. Therefore, in the present embodiment, for the distance image in the bright environment, the resolution is reduced by setting the pixel regions to be larger than the reference pixel region, such that each pixel is formed of many SPADs and the reflected light (from the object OB) is accurately determined by suppressing the effect of noise (the background light).

In the dark environment, the brightness of the background light is low. Thus, if each pixel is formed of a small number of SPADs, very little background light may be detected. For this reason, in the present embodiment, for the background light image in the dark environment, the resolution is reduced by setting the pixel regions to be larger than the reference pixel region, such that each pixel is formed of a large number of SPADs and the background light can be accurately determined.

According to the ranging device 10 of the first embodiment described above, the resolution of the distance image and the resolution of the background light image are controlled by setting the size of the pixel regions independently for the distance image and the background light image according to the intensity of the background light related to the acquired intensity-related information. This allows the resolution of the distance image and the resolution of the background light image to be appropriately set according to the usage environment of the ranging device.

In the bright environment, that is, when the intensity of the background light is high, the size of the pixel regions of the distance image is set to be larger than when the intensity of the background light is low and the resolution is thereby reduced, such that the reflected light (from the object OB) is accurately determined by suppressing the effect of noise (i.e., the background light). Therefore, the distance to the object OB can be accurately measured even when the object OB is located far away from the vehicle 500.

In the dark environment, that is, when the intensity of the background light is low, the size of the pixel regions of the background light image is set to be larger than when the intensity of the background light is high and the resolution of the background light image is thereby reduced, such that the background light can be accurately determined. Therefore, the determination threshold can be set to an appropriate value, and the reflected light (specifically, the peak) from the object OB can be accurately detected.

In addition, the brightness environment, that is, the high or low intensity of the background light, is determined using the four pieces of information (i) to (iv) described above. This allows the brightness environment to be accurately determined.

Each light receiving element 31 is formed of a SPAD. This allows the presence or absence of light reception at each pixel G to be accurately determined.

The background light image used to determine the determination threshold is acquired using the number of light receptions during a period of time in which no peak is detected, among the first half period Ta and the second half period Tb of the irradiation period T. Therefore, the intensity of the background light can be accurately determined without being affected by the reflected light. In addition, a period of time other than the irradiation period T, such as a period of time before emission of the illumination light Lz, is not required to acquire the background light image, which allows the background light image to be efficiently acquired. In addition, the background light image is acquired every irradiation period T, which allows the determination threshold to be set to an appropriate value even when the brightness environment changes partially within the illuminated region.

B. Second Embodiment

The device configuration of the ranging device 10 of the second embodiment is the same as that of the ranging device 10 of the first embodiment. Therefore, the same reference numerals are assigned to the same components and detailed description thereof is omitted. In addition, the process steps of the ranging process of the second embodiment are the same as those of the first embodiment illustrated in FIG. 4. Therefore, the same reference numerals are assigned to the same process steps and detailed description thereof is omitted.

In the ranging device 10 according to the second embodiment, the detailed process step S115 of the ranging process differs from that of the first embodiment. Specifically, in the bright environment, the resolution controller 82 sets the pixel regions of the distance image to the reference pixel regions and reduces the pixel regions of the background light image to increase the resolution of the background light image. In the dark environment, the resolution controller 82 sets the pixel regions of the distance image to be smaller than the reference pixel regions and sets the pixel regions of the background light image to the reference pixel regions.

In the bright environment, the intensity of the background light is high, such that even a small number of SPADs are sufficient to detect the intensity of the background light. Therefore, reducing the pixel regions allows the intensity of the background light to be acquired with high resolution.

In the dark environment, the intensity of the background light as noise is low, such that the reflected light from an object is readily determined. Therefore, even if the pixel regions are reduced, the reflected light can be accurately determined, and the distance image with high accuracy and high resolution can be acquired. Therefore, an object OB located far away from the vehicle 500 can be accurately determined, and a small object OB located near the vehicle 500 can be accurately determined.

The ranging device 10 of the second embodiment described above provides similar advantages as the ranging device 10 of the first embodiment. In addition, in the bright environment, the resolution of the background light image is increased by reducing the pixel regions, such that the intensity of the background light can be acquired with high resolution. In the dark environment, the resolution of the distance image is increased by reducing the pixel regions compared to the reference pixel regions, such that the distance image can be acquired with high resolution. Therefore, an object OB located far away from the vehicle 500 can be accurately determined, and a small object OB located near the vehicle 500 can be accurately determined.

C. Third Embodiment

The device configuration of the ranging device 10 of the second embodiment is the same as that of the ranging device 10 of the first embodiment. Therefore, the same reference numerals are assigned to the same components and detailed description thereof is omitted. The ranging process of the third embodiment illustrated in FIG. 7 differs from the ranging process of the first embodiment in that steps S105a, S110a, S115a, S140a, S145a, and S150a are performed instead of steps S105, S110, S115, S140, S145, and S150. The other process steps of the ranging process of the third embodiment are the same as those of the ranging process of the first embodiment. Therefore, the same reference numerals are assigned to the same process steps and detailed description thereof is omitted.

The information acquirer 81 acquires the intensity-related information of the background light for each predefined region at step S105a. In the present embodiment, the predefined region is a rectangular region whose vertical length is four times that of the pixel G (the reference pixel region) and whose lateral length is three times that of the pixel G. At step S105a, only the above information (i) among the above pieces of information (i) to (iv) is acquired for each predefined region, and the other three pieces of information (ii) to (iv) are acquired in the same manner as in the first embodiment. For the information (i), a pixel value of the background light of each pixel G included in the predefined region (the total number of light receptions during the period in which no peak was detected in the previous irradiation period T) is acquired.

At step S110a, the resolution controller 82 determines the brightness environment (the bright environment or the dark environment) of the illuminated region with the illumination light Lz for each predefined region based on the intensity-related information acquired at step S105a. The present embodiment differs from the first embodiment in that the brightness environment is classified into three brightness levels. That is, the environment is classified and determined into a total of three levels: a bright environment in which the average number of light receptions of the background light is greater than a first threshold, a medium environment in which the average number of light receptions of the background light is equal to or less than the first threshold and greater than a second threshold, and a dark environment in which the average number of light receptions of the background light is equal to or less than the second threshold. The second threshold value is less than the first threshold value.

At step S115a, the resolution controller 82 determines the resolution for each predefined region independently for the distance image and the background light image according to the brightness environment determined at step S110a.

Figure 8:
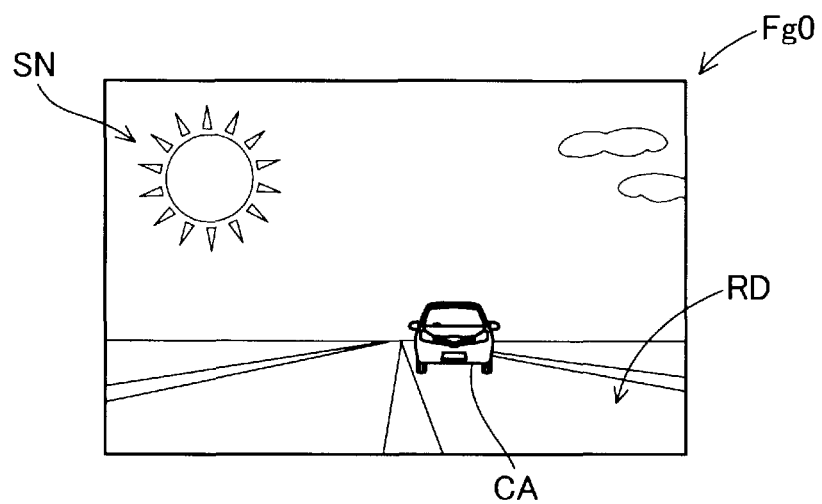
FIG. 8 is an example of a surrounding environment of the vehicle when the ranging process of the third embodiment is performed.

The image Fg0 illustrated in FIG. 8 represents an example of the surrounding environment ahead of the vehicle 500 during the ranging process. In this example, there is the sun SN and an oncoming vehicle CA traveling in an oncoming lane of the road RD ahead of the vehicle 500.

In a region where the sun SN is present as viewed from the vehicle 500, the intensity of the background light is high. Therefore, the brightness environment of each predefined region included in the region corresponding to the sun SN is determined as the bright environment. Therefore, as illustrated in the upper part of FIG. 9, in the distance image Fg1, for each predefined region included in the region P11 corresponding to the sun SN, a large pixel region is set as one pixel Gd3. For each predefined region included in the other region P12 excluding the region P11 in the distance image Fg1, the brightness environment of the predefined region is determined as the medium environment, and a medium-sized pixel region is set as one pixel Gd4. In the present embodiment, each pixel region of the predefined region whose brightness environment is determined as the bright environment in the distance image is the same as the predefined region, and is a rectangular region whose vertical length is four times that of the pixel G (the reference pixel region) and whose lateral length is three times that of the pixel G (the reference pixel region). In the distance image, each pixel region of the predefined region whose brightness environment is determined as the medium environment is a rectangular region whose vertical length is twice that of the pixel G (the reference pixel region) and whose lateral length is once that of the pixel G (the reference pixel region).

As illustrated in the lower part of FIG. 9, in the background light image Fg2, for each predefined region included in the region P11 whose brightness environment is determined as the bright environment, a small pixel region is set as one pixel Gb3. For each predefined region included in the other region P12 excluding the region P11 in the background light image Fg2, a medium pixel region is set as one pixel Gb4. In the present embodiment, each pixel region of the predefined region whose brightness environment is determined as the bright environment in the background light image is the same as the reference pixel region. In addition, each pixel region of the predefined region whose brightness environment is determined as the medium environment in the background light image is a rectangular region whose vertical length is twice that of the pixel G (reference pixel region) and whose lateral length is once that of the pixel G (reference pixel region). The region P11 in the background light image Fg2 corresponds to a bright part of the background light image in the present disclosure. The region P12 in the background light image Fg2 corresponds to an other part of the background light image, other than the bright part, in the present disclosure. The region P11 in the distance image Fg1 corresponds to a bright-part corresponding part of the distance image in the present disclosure. The region P12 in the distance image Fg1 corresponds to an other part of the distance image, other than the bright-part corresponding part, in the present disclosure.

Figure 10:
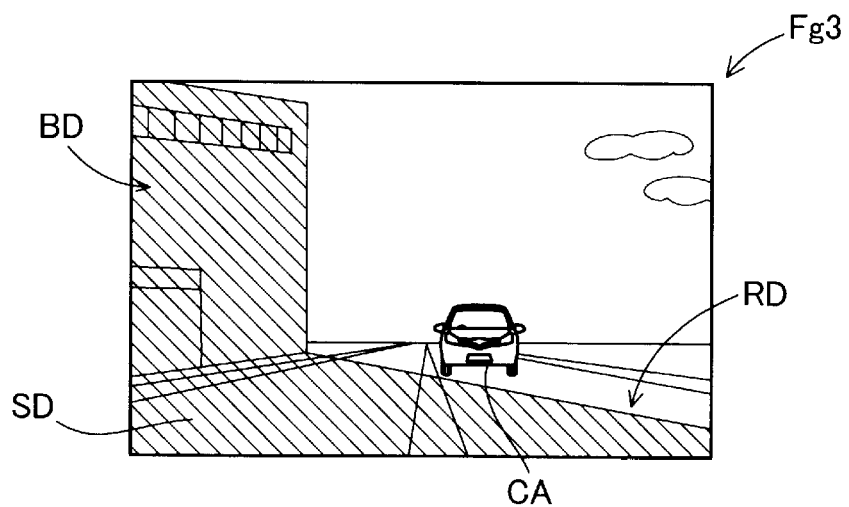
FIG. 10 is another example of the surrounding environment of the vehicle when the ranging process in the third embodiment is performed.

The image Fg3 illustrated in FIG. 10 represents another example of the surrounding environment ahead of the vehicle 500 during the ranging process being performed. In this example, there is a building BD and an oncoming vehicle CA traveling in an oncoming lane of the road RD ahead of the vehicle 500. A shade SD of the building BD extends into the road RD.

As viewed from the vehicle 500, the intensity of the background light is low in the region where the shadow SD exists. Therefore, the brightness environment of each predefined region included in such a region is determined as the dark environment. Therefore, as illustrated in the upper part of FIG. 11, in the distance image Fg4, for each predefined region included in the region P41 corresponding to the shade SD, a small pixel region is set as one pixel Gd5. For each predefined region included in the other region P42 excluding the region P41 in the distance image Fg4, the brightness environment is determined as the medium environment, and a medium-sized pixel region is set as one pixel Gd6. In the present embodiment, each pixel region of the predefined region whose brightness environment is determined as the dark environment in the distance image is the same as the reference pixel region.

As illustrated in the lower part of FIG. 11, in the background light image Fg5, for each predefined region included in the region P41 whose brightness environment is determined as the dark environment, a large pixel region is set as one pixel Gb5. For each predefined region included in the other region P42 excluding the region P41 in the background light image Fg5, the brightness environment is determined as the medium environment and a medium-sized pixel region is set as one pixel Gb6. The region P42 in the background light image Fg5 corresponds to a bright part of the background light image, in the present disclosure. The region P41 in the background light image Fg5 corresponds to an other part of the background light image, other than the bright part, in the present disclosure. The region P42 in the distance image Fg4 corresponds to a bright-part corresponding part of the distance image, in the present disclosure. The region P41 in the distance image Fg4 corresponds to an other part of the distance image, other than the bright-part corresponding part, in the present disclosure.

Figure 7:
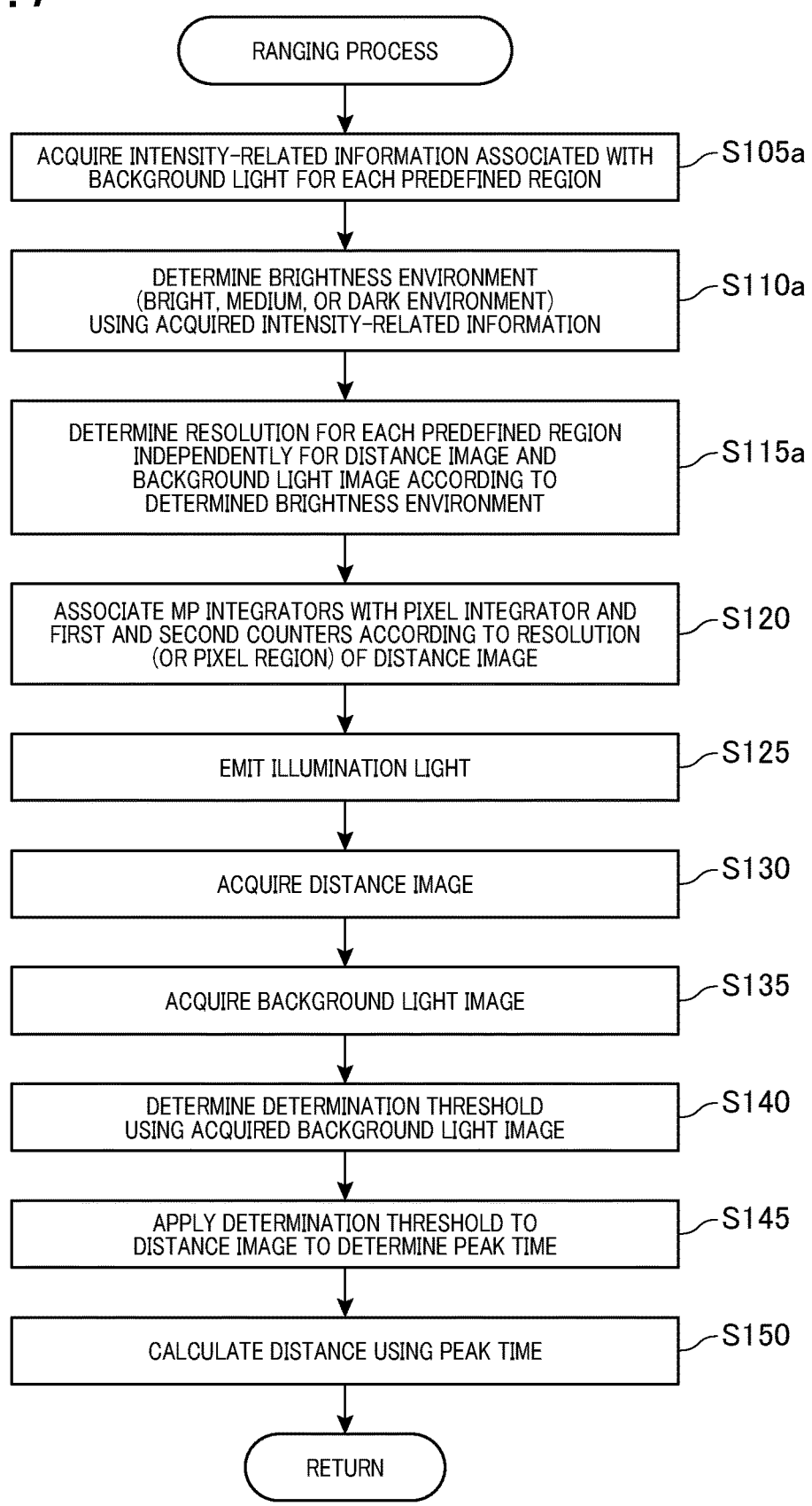
FIG. 7 is a flowchart of a ranging process of a third embodiment.

As illustrated in FIG. 7, after completion of step S115a, steps S120 through S150 described above are performed.

The ranging device 10 of the third embodiment described above provides similar advantages as the ranging device 10 of the first embodiment. In addition to these advantages, the brightness environment is determined for each predefined region and the resolution of the distance image is set, such that the distance and the reflected light can be measured with high resolution in a region where the intensity of the background light (noise) is low, and the distance and the reflected light can be accurately determined even in a region where the intensity of the background light is high. In addition, the brightness environment is determined for each predefined region and the resolution of the background light image is set, such that the background light can be accurately determined even in a region where intensity of the background light (noise) is low, and a more appropriate value can be set as the determination threshold in a region where the intensity of the background light (noise) is high.

D. Fourth Embodiment

Figure 12:
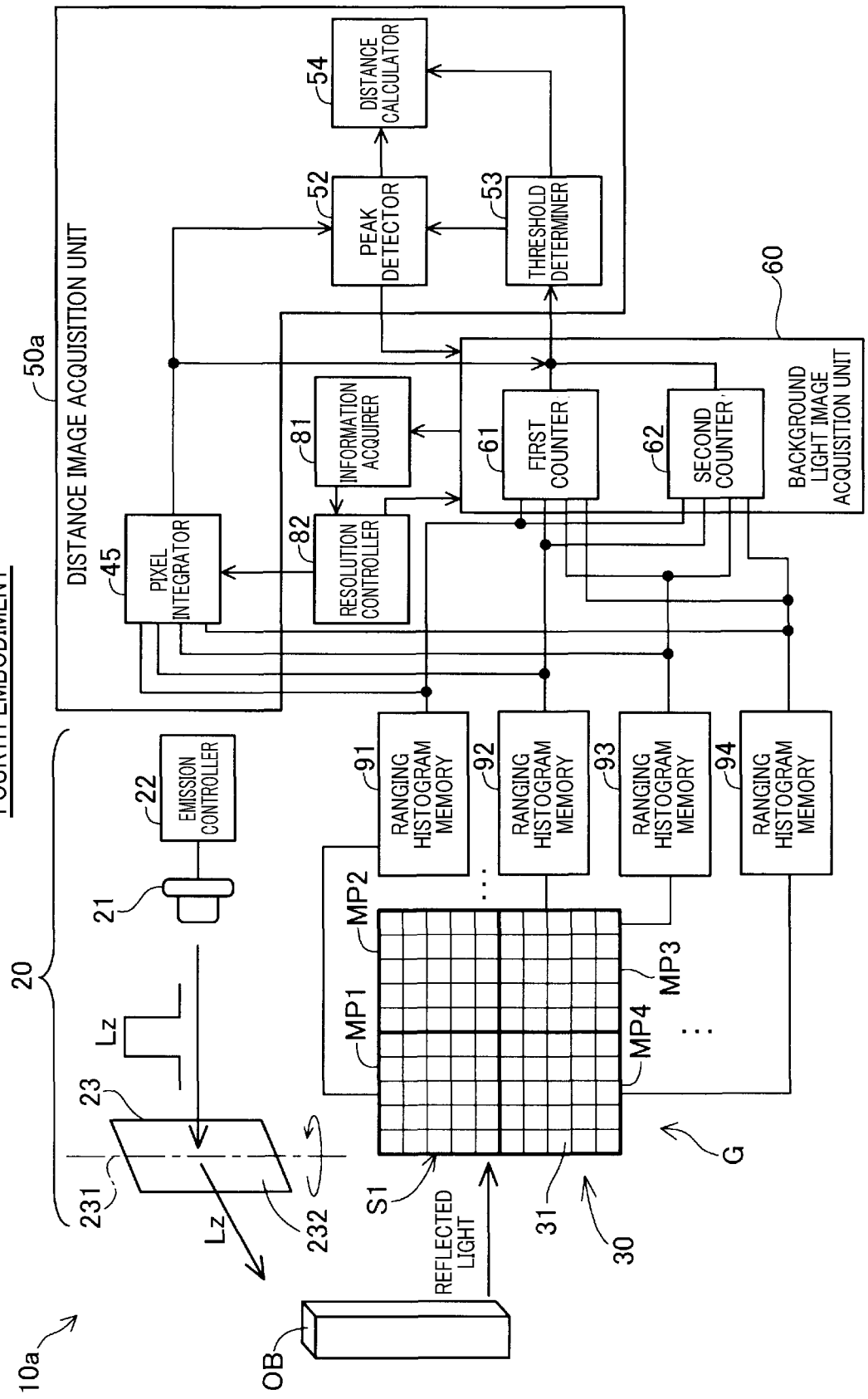
FIG. 12 is a block diagram of the ranging device of a fourth embodiment.

The ranging device 10a of the fourth embodiment differs from the ranging device 10 of the first embodiment in that, as illustrated in FIG. 12, ranging histogram memories 91, 92, 93, 94 are included instead of the MP integrators 41 to 44, and a distance-image acquisition unit 50a is included instead of the distance-image acquisition unit 50. The other configurations of the ranging device 10a of the fourth embodiment are the same as those of the ranging device 10 of the first embodiment. Therefore, the same reference numerals are assigned to the same components and detailed description thereof is omitted.

The ranging histogram memory 91 is connected to each of the light receiving elements 31 forming the macro pixel MP1, and stores a histogram for the macro-pixel MP1, that is, a histogram in which the number of light reception signals output from the light receiving elements 31 in the macro pixel MP1 is arranged by unit period. Similarly, the other ranging histogram memories 92 to 94 store histograms for macro pixels MP2 to MP4, that is, histograms in which the number of light reception signals output from the light receiving elements 31 in the macro pixels MP2 to MP4 is arranged by unit period.

The distance-image acquisition unit 50a differs from the distance-image acquisition unit 50 of the first embodiment in that the distance-image acquisition unit 50a does not include the ranging histogram memory 51, but includes the pixel integrator 45. The other configurations of the distance-image acquisition unit 50a of the fourth embodiment are the same as those of the distance-image acquisition unit 50 of the first embodiment. Therefore, the same reference numerals are assigned to the same components and detailed description thereof is omitted.

In the fourth embodiment, the pixel integrator 45 is connected to each of the ranging histogram memories 91-94. The pixel integrator 45 acquires histograms from the ranging histogram memories selected from the ranging histogram memories 91 to 94 according to the pixel region set by the resolution controller 82, and generates a ranging histogram by adding the acquired histograms. For example, for the distance image in the bright environment, the histograms for all the four macro pixels MP1 to MP4 may be added together to form a ranging histogram for one pixel. For the background light image in the bright environment, the histogram for the macro pixel MP1 and the histogram for the macro pixel MP4 may be added to form a ranging histogram for one pixel. Similarly, the histogram for the macro pixel MP2 and the histogram for the macro pixel MP3 may be added to form a ranging histogram for one pixel.

The ranging process of the fourth embodiment illustrated in FIG. 13 differs from the ranging process of the first embodiment in that step S120a is performed instead of step S120, steps S125 to S135 are omitted, and steps S126 and S128 are added. Other process steps in the ranging process of the fourth embodiment are the same as those in the ranging process of the first embodiment, such that the same reference numerals are assigned to the same process steps and detailed description thereof is omitted.

After completion of step S115, at step S120a, the resolution controller 82 associates the pixel integrator 45 with the ranging histogram memories according to the resolution of the distance image determined in the step S115, that is, the pixel region of the distance image, and the background light image acquisition unit 60 associates the two counters 61 and 62 with the ranging histogram memories according to the resolution of the distance image determined in the step S115, that is, the pixel region of the distance image. After completion of step S120a, emission of the illumination light Lz at step S125 is omitted, and at step S126 the background light image is acquired by adding up the number of light receptions of the background light from the selected macro pixels MP according to the resolution set at step S115. Similarly, at step S128, the distance image is acquired using the histogram generated by the pixel integrator 45 according to the resolution set at step S115. As described above, in the ranging device 10a of the fourth embodiment, the ranging histogram memories 91 to 94 are provided for the respective macro pixels MP1 to MP4, such that information about the number of light receptions at each macro pixel MP1 to MP4 is already acquired. Therefore, after the resolutions of the distance image and the background light image are determined at step S115, the determination threshold and the peak times can be determined, and the distance can be calculated based on the data (ranging histograms) stored in the ranging histogram memories 91 to 94 without emitting the illumination light Lz again. After completion of the step S128, the above-described steps S140 to S150 are performed.

The ranging device 10a of the fourth embodiment described above provides similar advantages as the ranging device 10 of the first embodiment.

E. Other Embodiments (E1) In each of the above-described embodiments, the determination threshold is determined at step S140 for each pixel G. However, the present disclosure is not limited thereto. For example, a single determination threshold may be determined for the entire image. In such a configuration, for example, an average of the pixel values (the numbers of light receptions) of all pixels G may be acquired and determined as a value greater than such an average. In each of the embodiments, the determination threshold is, for each one pixel of the distance image, the average of the numbers of light receptions at all pixels existing at the corresponding position in the background light image, but the present disclosure is not limited thereto. For example, for each one pixel of the distance image, the determination threshold may be a statistical value such as a variance or a median of all pixels existing at the corresponding position in the background light image.

(E2) In each of the above-described embodiments, as to the information (i) among the intensity-related information (i) to (iv) used to determine the brightness environment, the number of light receptions indicating the intensity of the background light image in the previous irradiation period T is used, but the present disclosure is not limited thereto. For example, the number of light receptions indicating the intensity of the background light image in the next previous irradiation period T may be used. For example, a statistical value such as an average, an integrated value, a median, or a variance of the intensities of the background light images over a plurality of irradiation periods T before the previous one may be used.

(E3) In each of the above-described embodiments, the intensity-related information used to determine the brightness environment includes a total of four pieces of information (i) to (iv), but the present disclosure is not limited thereto. For example, it may be configured that a user visually determines the brightness environment and inputs the determination result to the vehicle 500 via a user interface. In such a configuration, the information indicating the brightness environment input from the user interface corresponds to the intensity-related information. For example, some of the information (i) to (iv) may be omitted. For example, the volume or pitch of sound acquired by a microphone mounted to the vehicle 500 may be used as the intensity-related information. In such a configuration, for example, if the intensity of sound is higher than the threshold intensity, it may be estimated to be daytime and the brightness environment may be determined as the bright environment, and if the intensity of sound is below the threshold intensity, it may be estimated to be nighttime and the brightness environment may be determined as the dark environment.

(E4) In each of the above-described embodiments, the resolution of the distance image and the resolution of the background light image are determined in the ranging process, but the process steps of determining such resolutions may be performed as a separate process from the ranging process. Specifically, in the resolution determination process, emission of the illumination light Lz and reception of the reflected light are first performed, and then the above-described steps S105 to S120 and S140 are performed. In the ranging process, the process steps S125, S130, S135, S145, and S150 are performed. In such a configuration, the same effects as in each embodiment are achieved.

(E5) In each of the above-described embodiments, the images acquired in the ranging process are the distance image and the background light image, but in addition to these images, an image showing the reflectance from the object OB at each pixel (hereinafter referred to as a "reflection intensity image") may be acquired. In such a reflection intensity image, the same resolution as that of the distance image may be determined.

(E6) The ranging device 10 in each of the above-described embodiments may be applied to the following devices. For example, the ranging device 10 may be applied to a route generating device that generates a travel route of the vehicle 500. In such a configuration, the distance to the object OB detected by the ranging device 10 may be used to generate a route that avoids obstacles on the road being traveled. The ranging device 10 may also be applied to an autonomous driving control device. In such a configuration, the distance to the object OB detected by the ranging device 10 may be used to determine the speed and the amount of steering of the vehicle 500. For example, the ranging device 10 may be applied to a detection result display device for displaying the distance to the object OB to an occupant of the vehicle 500. In such a configuration, the occupant of the vehicle 500 can visually confirm the distance to an object present ahead of the vehicle 500. The ranging device 10 may also be applied to a remote information acquisition device for notifying a remote operation control device of a surrounding situation of the vehicle 500. In such a configuration, in addition to the information about the distance to the object OB, the distance image and the background light image may be transmitted to the remote operation control device (e.g., a server device) on the operator side that remotely operates the vehicle 500. The ranging device 10 may also be fixedly installed instead of being mounted to the vehicle 500. For example, the ranging device 10 may be mounted to a monitoring camera (fixed-point camera) to acquire images and measure the distance to the object OB.

(E7) In each of the above-described embodiments, the background light image used to determine the determination threshold is acquired using the number of light receptions during a period of time in which no peak is detected, among the first half period Ta and the second half period Tb of the irradiation period T. However, the present disclosure is not limited thereto. For example, the background light image may be acquired using the total number of light receptions over both the first half period Ta and the second half period Tb of the irradiation period T regardless of the presence or absence of the peak. In such a configuration, for example, a value acquired by multiplying the total number of light receptions over both the first half period Ta and the second half period Tb of the irradiation period T by a certain percentage may be set as the determination threshold. In addition, in each of the above-described embodiments, the first half period Ta and the second half period Tb are equal in length, but the present disclosure is not limited thereto. For example, the irradiation period T may be subdivided into ten equal parts. The first half period Ta may have a length of $9/10$ T and the second half period Tb may have a length of $1/10$ T. With this configuration, reflected light from a much further distance where an object almost certainly does not exist is likely to be received during the second half period Tb. That is, light reception may be limited to light reception during a non-irradiation period. For this reason, the peak determination process performed by the background light image acquisition unit 60 may be omitted, and the total number of light receptions in the second half period Tb may be used as the background light intensity. In addition, any kind of statistical value, such as an average, a median, a standard deviation, a variance, or the like, of the number of light receptions may be used as the background light intensity instead of the total number of light receptions.

(E8) The configuration of the ranging device 10 in each of the above-described embodiments is only an example and may be modified in various ways. For example, in each of the first and second embodiments, the brightness environment is classified into three brightness levels, and in the third embodiment, the brightness environment is classified into three brightness levels, but the brightness environment may be classified into any number of levels. In addition, the resolution (the size of the pixel region) of each of the distance image and the background light image in each brightness environment may be set to an arbitrary value. In addition, the size of the predefined region in the third embodiment may be arbitrarily set. For example, each of the whole distance image and the whole background light image divided into four equal parts, and one of the four parts may be used as the predefined region. In addition, any light receiving element other than the SPAD may be used as the light receiving element 31.

(E9) The ranging device 10 and its method described in the present disclosure may be implemented by a dedicated computer including a processor and a memory programmed to execute one or more functions, e.g., functions of functional blocks 22, 41-44, 45, 50, 50a, 60, 81, 82, 91-94 illustrated in FIGS. 2 and 4, embodied by computer programs. Alternatively, the ranging device 10 and its method described in the present disclosure may be implemented by a dedicated computer including a processor formed of one or more dedicated hardware logic circuits, or may be implemented by one or more dedicated computers including a combination of a processor and a memory programmed to execute one or more functions and a processor formed of one or more dedicated hardware logic circuits. The computer programs may be stored, as instructions to be executed by a computer, in a non-transitory, tangible computer-readable storage medium.

The functions of a single component may be distributed to a plurality of components, or the functions of a plurality of components may be integrated into a single component. At least part of the configuration of the above embodiments may be replaced with a known configuration having a similar function. At least part of the configuration of the above embodiments may be removed. At least part of the configuration of one of the above embodiments may be replaced with or added to the configuration of another one of the above embodiments. While only certain features of the invention have been illustrated and described herein, many modifications and changes will occur to those skilled in the art. It is, therefore, to be understood that the appended claims are intended to cover all such modifications and changes as falling within the true spirit of the invention.

What is claimed is:

1. A ranging device for measuring a distance to an object, comprising: a light emitting unit configured to emit illumination light every irradiation period;
a light receiving unit including a two-dimensional array of a plurality of light receiving elements on a light receiving surface, the light receiving unit being configured to output a light reception signal in response to a light reception state of a set of the light receiving elements within a respective one of pixel regions whose size is variably set, the set of the light receiving elements forming one pixel;

a distance image acquisition unit configured to, using the light reception signals output from the light receiving unit, acquire a distance image that indicates, at each pixel, a distance to the object within a region illuminated with the illumination light;

a background light image acquisition unit configured to, using the light reception signals output from the light receiving unit, acquire a background light image that indicates an intensity of background light received at each pixel;

an information acquirer configured to acquire intensity-related information related to the intensity of the background light; and a resolution controller configured to control a resolution of the distance image and a resolution of the background light image by setting a size of the pixel regions independently for each of the distance image and the background light image according to the intensity of the background light indicated by the intensity-related information.

2. The ranging device according to claim 1, wherein the resolution controller is configured to, when the intensity of the background light indicated by the intensity-related information is high, set the size of the pixel regions included in at least a part of the background light image to be smaller than when the intensity of the background light is low.

3. The ranging device according to claim 2, wherein the resolution controller is configured to set the size of the pixel regions included in a bright part of the background light image, where the intensity of the background light is equal to or higher than a predetermined threshold, to be smaller than the size of the pixel regions included in an other part of the background light image, other than the bright part.

4. The ranging device according to claim 2, wherein the resolution controller is configured to set the size of the pixel regions included in a bright part of the background light image, where the intensity of the background light is equal to or higher than a predetermined threshold, to be smaller than the size of the pixel regions included in an other part of the background light image, other than the bright part, the resolution controller is configured to, when the intensity of the background light indicated by the intensity-related information is high, set the size of the pixel regions included in at least a part of the distance image to be larger than when the intensity of the background light is low, the resolution controller is configured to set the size of the pixel regions included in a bright-part corresponding part of the distance image, which is a part of the distance image corresponding to the bright part of the background light image, to be larger than the size of the pixel regions included in an other part of the distance image, other than the bright-part corresponding part of the distance image.

5. The ranging device according to claim 1, wherein the resolution controller is configured to, when the intensity of the background light indicated by the intensity-related information is high, set the size of the pixel regions included in at least a part of the distance image to be larger than when the intensity of the background light is low.

6. The ranging device according to claim 1, wherein the intensity-related information includes at least one of:
(i) information indicating the intensity of the background light;
(ii) information indicating a lighting state of a light of the vehicle carrying the ranging device;
(iii) information indicating a result of detection by a solar radiation sensor mounted to the vehicle and configured to detect an amount of daylight illumination; and
(iv) information indicating an operating state of a wiper device of the vehicle.

7. The ranging device according to claim 1, wherein each of the light receiving elements comprises a single photon avalanche diode (SPAD) that outputs an output signal indicating incidence of light as the light reception signal.

8. The ranging device according to claim 1, wherein each of the light receiving elements comprises a single photon avalanche diode (SPAD) that outputs an output signal indicating incidence of light as the light reception signal, and the background light image acquisition unit is configured to: divide the irradiation period into a plurality of unit periods of equal temporal length and calculate a total number of the SPADs that output the output signal during a respective one of the plurality of unit periods;

determine whether there is at least one unit period, of the plurality of unit periods, in which the total number of the SPADs is equal to or greater than a predetermined threshold;

in response to determining that there is at least one unit period, of the plurality of unit periods, in which the total number of the SPADs is equal to or greater than the predetermined threshold, acquire the background light image by using the total number of the SPADs that output the output signal in a respective one of other unit periods other than the at least one unit period in which the total number of the SPADs is equal to or greater than the predetermined threshold; and in response to determining that there is not any unit period, of the plurality of unit periods, in which the total number of the SPADs is equal to or greater than the predetermined threshold, acquire the background light image by using the total number of the SPADs that output the output signal in a respective one of the plurality of unit periods.

* * * * *